United States Patent [19]
Houck et al.

[11] Patent Number: 6,021,118
[45] Date of Patent: Feb. 1, 2000

[54] SYNCHRONIZATION METHODS FOR DISTRIBUTED PROCESSING SYSTEMS HAVING REPLICATED DATA

[75] Inventors: David J. Houck, Colts Neck; Kin K. Leung, Edison; Peter M. Winkler, Madison, all of N.J.

[73] Assignee: Lucent Techologies Inc., Murrray Hill, N.J.

[21] Appl. No.: 08/795,263

[22] Filed: Feb. 10, 1997

[51] Int. Cl.[7] .................................. H04L 12/28; H04J 3/06
[52] U.S. Cl. ............................................. 370/254; 370/503
[58] Field of Search ..................................... 370/229, 231, 370/254, 255, 400, 503, 411; 395/200.78, 200.79, 200.62, 200.63, 200.64, 200.65, 200.68, 181.02, 182.02

[56] References Cited

U.S. PATENT DOCUMENTS 5,255,368  10/1993  Barry ........................................ 395/200

OTHER PUBLICATIONS

Reichmeyer et al, "Hypercube–Based Local Lightwave Networks", 1992IEEE, pp. 1193–1196, 1992.

*Primary Examiner*—Chi H. Pham
*Assistant Examiner*—Afsar Qureshi

[57] ABSTRACT

A data synchronization system, which in one embodiment, uses a ShuffleNet topology requiring an even number, $N=2m$, of nodes in the system. These nodes are organized into two sets, $X=x_0, \ldots, x_{m-1}$ and $Y=y_0, \ldots, y_{m-1}$, wherein the subscripts are always to be taken modulo m. Each "round" of communication entails simultaneously synchronizing the nodes in X with nodes in Y according to a matching between the two sets. The rounds are grouped into two "batches," batch $B_j$ which consists of rounds $R_{2j-1}$ and $R_{2j-2}$ for $j \geq 1$. During each odd batch $B_{2j-1}$, each $x_i$ synchronizes with $y_{2i+2j-2}$ and with $y_{2i+2j-1}$. In another embodiment, the data synchronization is based on a hypercube scheme, wherein each node is labeled by a binary string and any two nodes with their labels differing by one bit are connected by an edge and only adjacent nodes, i.e. those nodes connected by an edge, can communicate and exchange data directly according to an update schedule. In a third embodiment, a hypercube scheme is used, but the number of nodes is assumed to be a power of 2 or $N=2^m$. This embodiment, like the second embodiment, uses the labeling of nodes by their binary representation, but the matchings of nodes used to determine the update schedule is not confined to the hypercube edges. Instead, a general cyclic matching scheme is used.

20 Claims, 4 Drawing Sheets

ROUNDS: R1 R2 R3 R4
BATCHES: B1 B2

SYNCHRONIZATION METHODS FOR DISTRIBUTED PROCESSING SYSTEMS HAVING REPLICATED DATA

FIELD OF THE INVENTION

The present invention relates generally to distributing replicated data files among multiple, geographically distributed locations and more particularly to synchronization methods for distributing such data files across network systems.

BACKGROUND OF THE INVENTION

As is generally known in the art, in distributed processing systems, users' data files are often distributed and replicated at multiple, geographically dispersed locations to reduce access time and to improve data availability in case of failure. Because a data file can be replicated at multiple locations, the distribution of replicated files must be synchronized. If these replicated files are not synchronized, then obsolete data may be inadvertently used by one of the multiple users. For this reason, those skilled in the art have directed a great deal of attention to providing concurrency control of these replicated data files.

There are several different methods of concurrency control. The simplest of these methods involves allowing users to continuously access replicated data stored at local servers and synchronizing the replicated files to periodically reconcile differences among the files. Of course, for heavily used multiple access systems like data records held by banking systems, which contain customer account information, etc., more stringent concurrency control measures (e.g. locking protocols) are necessary to avoid fraudulent activity or data interpretation errors.

Generally, any of these distributed network systems have multiple computing nodes (hereinafter nodes) placed at different locations. Each of these nodes has a database of some form (i.e. a collection of data files) and a processing capability. User data files can either be categorized as global data or non-global data. Global data files are referenced by all users, so they, by definition, are replicated, distributed and stored at each node in the entire network system. Non-global data files, however, are accessed only by a certain group of users and the files are stored only at selected nodes to meet the processing needs.

Typically, all nodes in a network can communicate and exchange data with each other over a communication system of some type, for example, an FDDI network, wide area packet-switching network, etc. When logging onto the system, users are normally connected to a specific node where they use data files, which are either global, non-global, or user specific.

Typically in a system with periodic updates, a pair of nodes sets up a synchronization session to identify and exchange updated copies of their common files. If a common file at only one of the nodes has been changed since the last synchronization, then the obsolete copy at the other node is replaced by the new one. If both copies have been updated, then the difference between them is stored along with original version of the file at both nodes. In this case, users are informed that two copies have been updated concurrently since the last synchronization and it is up to the user or a system administrator to resolve the update conflict. Each synchronization session is represented by the processing of a connection record that specifies the pair of nodes involved in the synchronization.

In any of these synchronization methods, there is some update delay of any one file. The update delay is defined as the time interval from the instant a file is updated at one node until the updated data becomes available in a replicated copy of the same file at another node. The maximum update delay is the longest update delay from any one node to all other nodes. Of course, it is important to minimize the maximum update delay by developing an efficient schedule for the synchronization sessions. As data files are expected to be updated continuously, data synchronization must take place repeatedly. Of course, the natural approach would be to synchronize the replication of the data files at a fixed, periodic schedule.

Since updated data can, and usually does, propagate from one node to another node via some intermediate nodes, the precedence relationship among the synchronization sessions needs to be maintained in order to achieve the targeted results. For example, for new data propagated from node A to node C via node B, the synchronization session between node A and node B should be completed before that between node B and C begins. Therefore, it is desirable to complete a synchronization session within the allocated time period with a very high probability. Unfortunately, the update delay is directly proportional to the time period allocated for each session. As a result, the time period for each session should be minimized while keeping the probability of a session exceeding the allotted time satisfactorily low at the engineered traffic load, i.e. in terms of update frequency and the amount of data to be exchanged among nodes. For most synchronization schemes, it is assumed that a fixed time period is allocated to all sessions, regardless of the pair of nodes involved and the amount of data exchanged during the synchronization period. Based on this assumption, usually the amount of time allocated for each session is referred to as session time.

Although a fixed session time is assumed here, the important point is to maintain precedence relationships among synchronization sessions. Thus, in the above example, node B may begin synchronizing with node C as soon as it is done synchronizing with node A.

An advanced multihop communication method, which is analogous in that nodes need to propagate updated data to all other nodes via some intermediate nodes in the data synchronization, and has been known in the art, is described in U.S. Pat. No. 4,914,648 issued to Acampora et al on Apr. 3, 1990 and entitled, "Multichannel, Multihop Lightwave Communication System," which is incorporated herein by reference. Briefly, this system enables users to communicate efficiently in multihop lightwave networks. The user nodes communicate with each other via intermediate nodes (i.e. multihop communication), including the change of wavelengths in case of wavelength multiplexing on a common optical fiber. The multihop lightwave communication network of Acampora et al allows packet concurrency in the network while avoiding the need for agile optical devices. The network comprises a lightwave communication medium which supports a number of independent user nodes and a plurality of N network interface units (NIUs). Each NIU is connected to the lightwave medium and one or more separate user nodes and comprises a transmitter section and a receiver section which are each fixedly assigned to transmit and receive, respectively, over a single channel or a plurality of separate channels to or from other NIUs of the network. In a connectivity pattern for the network of Acampora et al, the NIUs are divided into k groups of $p^k$ NIUs such that each NIU of a first group of $p^k$ NIUs is capable of transmitting over the fixed assigned single channel, or any or all of the p separate channels, to a preferred one or all of the associated p separate NIUs of a second group, etc. based on a generalization of a perfect shuffle pattern. This technique permits all NIUs of the network to communicate with all other NIUs either via a single hop or via multiple hops where NIUs in subsequent groups of $p^k$ NIUs act as intermediate retransmission units. This shuffle pattern has been termed "ShuffleNet" and provides full connectivity among nodes so that each user can communicate with all other users. Unfortunately, with this system, any time new nodes are added, the ShuffleNet pattern must be updated in the system. Therefore, because it is envisioned that future and even present day networks are constantly being updated with respect to the number of nodes on any one network, it is recognized that any synchronization system must be adaptable to this reality.

Moreover, it has been recognized in the art that any ideal solution to the data synchronization should also provide a low maximum update delay, an ability to withstand at least one node failure, and a minimal transfer of non-global data. Accordingly, there still exists a need in the art to provide an efficient, effective method to distribute and synchronize replicated data files. The present invention addresses such a need.

SUMMARY OF THE INVENTION

Accordingly, one object of the present invention is to provide an efficient, effective method to distribute and synchronize replicated data files over multiple, geographically disperse networked systems.

Another object of the present invention is to provide such a system which minimizes the maximum update delay, withstands at least one node failure or at least minimizes the maximum update delay when more than one node fails, transfers only a minimal amount of global data, and reduces the processing complexity.

Still another object of the present invention is to provide such a system in which the synchronization schedule does not have to be updated when new nodes are added.

These and other objects of the invention are accomplished by a data synchronization system, which in one embodiment, uses a ShuffleNet topology requiring an even number, $N=2m$, of nodes in the system. These nodes are organized into two sets, $X=x_0, \ldots, x_{m-1}$ and $Y=y_0, \ldots, y_{m-1}$, wherein the subscripts are always to be taken modulo m. Each "round" of communication entails simultaneously synchronizing the nodes in X with nodes in Y according to a matching between the two sets. The rounds are grouped into "batches," batch $B_j$ consisting of rounds $R_{2j-1}$ and $R_{2j}$ for $j \geq 1$.

During each odd batch, $B_{2j-1}$, each $x_i$ synchronizes with $y_{2i+2j-2}$ and with $y_{2i+2j-1}$. As those skilled in the art will readily recognize, the matching between the two sets can be accomplished with two matchings; this is simply shown as a consequence of Hall's Marriage Theorem. Similarly, during even batches, $B_{2j}$, each $y_i$ synchronizes with $x_{2i+2j-2}$ and $x_{2i+2j-1}$. With this matching scheme, it is important to note that, in contrast to other ShuffleNet schemes where connectivity is directional, the edges in the present invention are undirected, which reflects that data flows in both directions during a synchronization session. Moreover, although other ShuffleNet topolgies permit more than two nodes sets and more than two "rounds per batch," the present topology almost always gives the best performance. Further, in contrast to other Shufflenet topologies, the batch connections, as will be explained in the Detailed Description, are rotated so that the present topology is a complete biparite graph.

In another embodiment of the present invention, the data synchronization is based on a hypercube topology, wherein each node is labeled by a binary string and any two nodes with their labels differing by one bit are connected by an edge and only adjacent nodes, i.e. those nodes connected by an edge, can communicate and exchange data directly. Even with this limitation for direct synchronization communication, all node pairs can still communicate via intermediate nodes, as will be explained in the Detailed Description. Unlike the connectivity which is typical of most hypercube schemes for multiple processor systems, the present method involves exchanging data in multiple rounds (or stages) where each round corresponds to the connectivity with node labels differing at certain bit positions. Therefore, while continuing to use a timer based processing schedule, the present invention schedules the synchronization sessions between pairs of nodes to propagate new data from any one node to all other nodes with a maximum update delay of $\log_2 N$ (assuming N is a perfect power of 2) session times. With such a schedule, each round of connectivity also corresponds to one round of synchronization sessions (updates).

In a third embodiment, a generalized hypercube like schedule is used, but the number of nodes is assumed to be a power of 2 or $N=2^m$. This embodiment, like the second embodiment, uses the labeling of nodes by their binary representation, but the matchings used to determine the update schedule is not confined to the hypercube edges. Instead, a cyclic matching scheme is used. Specifically, if $x=(x_1, \ldots, x_m)$ is a non-zero binary vector, then $M_x$ is used to denote a matching set of nodes, u, with nodes labeled x+u. In this scheme, the addition is coordinatewise and modulo 2, so that $x+u+u=x$ and therefore, the pairing relation is symmetric. With this scheme, if matchings corresponding to all the non-zero vectors are cycled through, for example, $x(1)$, $x(2), \ldots, x(N-1)$ and back to $x(1)$, then each node is paired with every other node. Even though the update delay for this scheme will generally be larger than m (an undesirable effect), the optimality of the update delay can be easily calculated as a simple condition of the network.

BRIEF DESCRIPTION OF THE DRAWINGS

These and other features of the invention will be better understood in light of the following Detailed Description of the Invention and the attached Figures wherein.

DETAILED DESCRIPTION OF THE INVENTION

Figure 1:
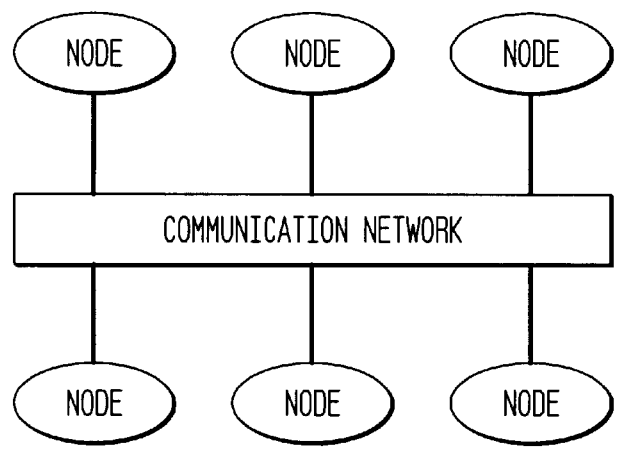
FIG. 1 is a generalized depiction of a network topology for data distribution.

Now referring to the FIG. 1, there is shown a generalized depiction of a network topology for data distribution. As shown, it is ideal to have all nodes communicate and exchange date with each other over a similar communication network, which can be an FDDI network, wide-area packet-switching network, etc. When logging into the system, users are normally connected to a specific node where they expect to find their needed data files in the local database. This local database can include any number of file types, including globally shared files, non-globally shared files, or user specific files.

In one embodiment of the present invention the synchronization topology uses a ShuffleNet topology which requires an even number, $N=2m$, of nodes in the system. These nodes are organized into two sets, $X=x_0, \ldots, x_{m-1}$ and $Y=y_0, \ldots, y_{m-1}$, wherein the subscripts are always to be taken modulo m. Each "round" of communication entails simultaneously synchronizing the nodes in X with nodes in Y according to a matching between the two sets. The rounds are grouped into two "batches," batch $B_j$ which consists of rounds $R_{2j-1}$ and $R_{2j}$ for $j \geq 1$.

During each odd batch $B_{2j-1}$, each $x_i$ synchronizes with $y_{2i+2j-2}$ and with $y_{2i+2j-1}$. As those skilled in the art will readily recognize, the matching between the two sets can be accomplished with two matchings; this is simply a consequence of Hall's Marriage Theorem. Similarly, during even batches $B_{2j}$, each $y_i$ synchronizes with $x_{2i+2j-2}$ and $x_{2i+2j-1}$.

Figure 2:
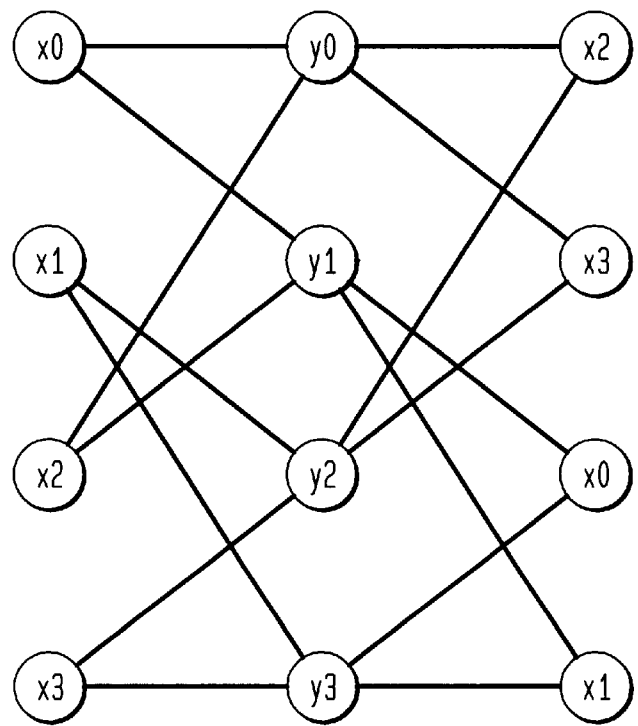
FIG. 2 is a topology diagram according to one embodiment of the present invention for an 8 node system.
Figure 3:
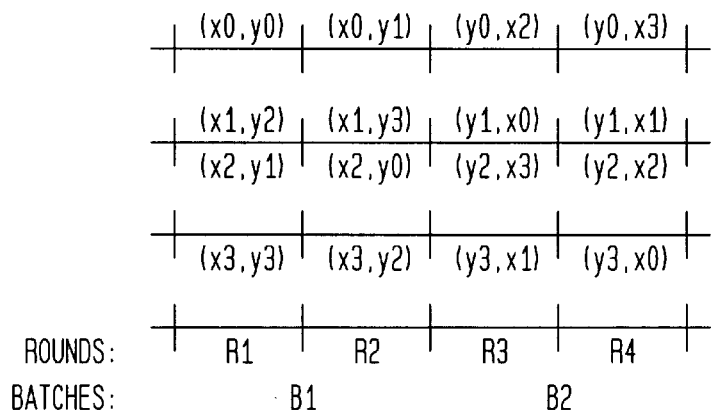
FIG. 3 is a processing schedule according to the present invention using the topology of FIG. 2.

Now referring to FIGS. 2 and 3, there is shown in FIG. 2, a topology diagram according to the embodiment of the present invention which is based on a Shufflenet topology, nominally for an 8 node system. In FIG. 3, a processing schedule is shown using the topology shown in FIG. 2. As shown in FIG. 2, the first batch of communications for the 8 node system comprises $x_{0\ through\ 3}$ communicating with $y_{0\ through\ 3}$, wherein $x_{0\ and\ 2}$ communicate with $y_{0\ and\ 1}$ and $x_{1\ and\ 3}$ communicate with $y_{2\ and\ 3}$. In the second batch, $y_{0\ and\ 2}$ communicate with $x_{2\ and\ 3}$ and $y_{1\ and\ 3}$ communicate with $x_{0\ and\ 1}$, as per the synchronization scheme described above. This is further exemplified in the scheduling process of the present invention, which is shown in FIG. 3. Each round is marked as $R_{1-4}$ and the two batches necessary for the 8 node system are marked as $B_{1-2}$. For example, for $x_0$ $R_1$, $x_0$ communicates with $y_0$, and for $x_0$ in $R_2$, $x_0$ communicates with $y_1$. Similarly, the nodes $x_{1-3}$ communicate with their respective y nodes in the two rounds of the first batch. In the second batch, $Y_{0-3}$ communicates with the $x_{0-3}$ as per the equation given above. For example, for $y_0$ in $R_3$, $y_0$ communicates with $x_2$, and for $y_0$ in $R_4$, $y_0$ communicates with $x_3$. Similarly, the nodes $y_{1-3}$ communicate with their respective x nodes in the two rounds of the second batch.

With the matching scheme of this embodiment, it is important to note that, in contrast to other ShuffleNet schemes where connectivity is directional, the edges in the present invention are undirected, which reflects that data flows in both directions during a synchronization session. Moreover, although other ShuffleNet topologies permit more than two nodes sets and more than two "rounds per batch," the present topology almost always gives the best performance. Further, in contrast to other ShuffleNet topologies, the batch connections, as will be explained further, are rotated so that the present topology is a complete biparite graph.

Given this modified ShuffleNet topology of the present invention, the maximum update delay for the present invention is at most $2\lceil \log_2 N \rceil + 1$. This is shown as follows:

If a consecutively numbered set of k nodes in X have been updated prior to the start of an odd batch, then by the end of the batch, either 2k consecutive nodes or all the nodes of Y have been updated. Of course, a similar statement applies with the roles of X and Y exchanged during even batches.

For example, assume that that data is entered at node $x_i$ just prior to the first round, $R_1$. Given this, then the data reaches all the nodes in one column or the other after 2k rounds (k batches) where $k=\lceil \log_2 m \rceil$. One more round will update the nodes in the other column as well, for a total of $2\lceil \log_2 N \rceil - 1$ rounds.

As another example, if data is entered at $x_i$ just prior to the second round, then the analysis can be applied to its second round mate $y_j$ in a similar manner to that of data entered prior to round one, at the cost of one additional round of delay. Of course, in an example of data entered just prior to round 4, the results are also similar. If $x_i$ gets its data just prior to the third round, then it and a neighbor node ($x_{i-1}$ or $x_{i+1}$) will be updated by the end of the batch for a total update delay of $2+2\lceil \log_2 m/2 \rceil + 1 = 2\lceil \log_2 N \rceil - 1$ rounds, which is the same as the first example.

The maximum delay according to this embodiment of the present invention can be reduced slightly, asymptotically, by employing three rounds per batch instead of two. This is because $3^{1/3}$ is greater than $2^{1/2}$. Of course, for larger numbers of rounds per batch, the delay can be reduced even further. However, in practice, the 2 round per batch scheme described is believed to always provide the best performance.

It should be noted that the present invention as a ShuffleNet topology, repeats every m rounds for m's which are even and every 2m rounds for m's which are odd. In light of this, it is evident that the same maximum update delay with a schedule which repeats every four rounds is also feasible. Using this rotation scheme, i.e. the complete biparite graph as the topology for the data distribution, has two distinct advantages. First, it takes m−1 node failures to disconnect the network, that is, the rotation schedule is more robust. Second, non-global files can be passed directly from any X-node to any Y-node, if it becomes desirable to keep them out of the general message flow. Additionally, it should be noted that from an X to X or Y to Y, only one intermediate node is required.

When new nodes are added to a system according to the present invention, parts of the processing schedule for this scheme have to be changed accordingly. Thus, this scheme might not be advantageous for systems with constant growth. However, the following embodiment of the present invention corrects for this.

Figure 4A:
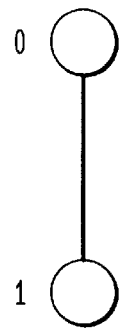
FIGS. 4a–c are schematic representations of the generic hypercube scheme for 2, 4 and 8 nodes.
Figure 4B:
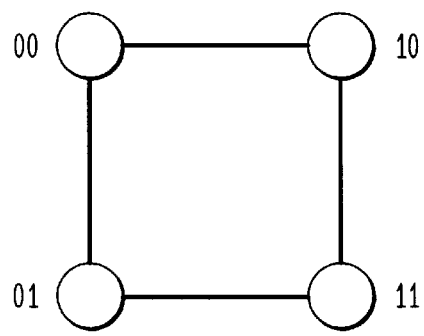
Figure 4C:
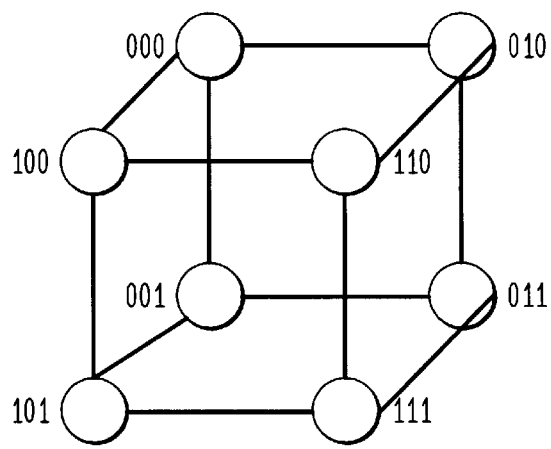
Figure 5:
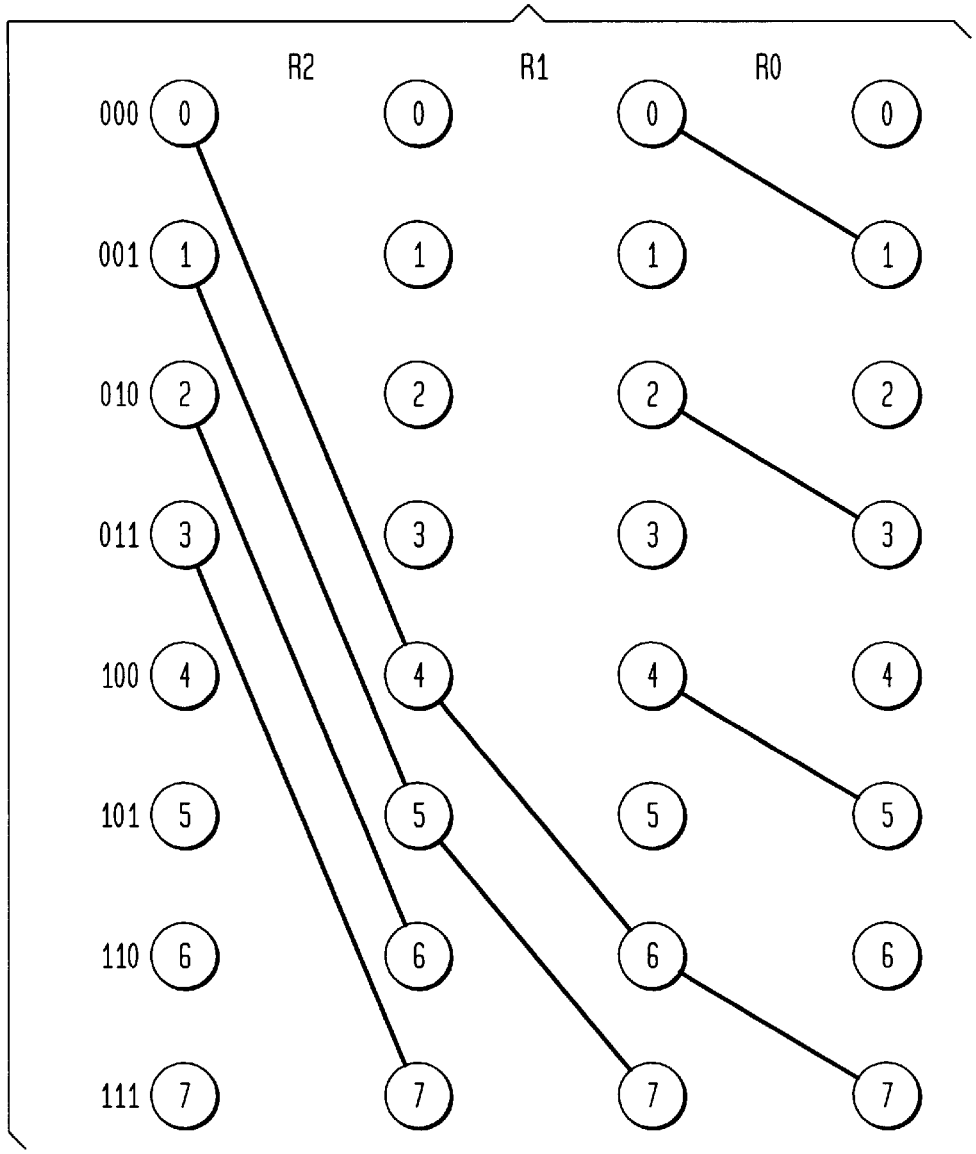
FIG. 5 is a diagram showing the hybercube connectivity according to another embodiment of the present invention using conventional identification of the various nodes wherein the network has 8 nodes.

Another embodiment of the present invention is shown in FIGS. 4a–c and FIGS. 5 and 6, where there is shown three simple representations of generic hypercube schemes for 2, 4 and 8 nodes (FIGS. 4a–c, respectively) and various rounds of nodal connectivity and the scehduling necessary for the present invention (FIG. 5). Hypercubes have been studied widely by computer scientists to support efficient communication among multiple processors. For example, such hypercube schemes are described in U.S. Pat. No. 5,255,368, issued to Barry on Oct. 19, 1993, entitled, "Method For Selecting Data Communications Paths For Routing Messages Between Processors In A Parallel Processing Computer System Organized As A Hypercube," and in U.S. Pat. No. 4,868,830, issued to Pollara-Bozzolla on Sep. 19, 1989, entitled, "Method And Apparatus For Implementing A Traceback Maximum-Likelihood Decoder In A Hypercube Network;" both of these patents are incorporated herein by reference. Unlike these previous schemes, however, each node according to the present invention is labeled by a binary string and any two nodes which have their label differing by one bit are connected by an edge and only adjacent nodes (i.e. those connected by an edge) can communicate and exchange data directly. Those skilled in the art will recognize that all nodes can communicate with each other with this method even though it will be via some intermediate node(s).

Although the present invention can be thought of in the generic hypercubes as represented in FIGS. 4a–c, the present invention is more appropriately shown in multiple rounds (or stages) where each round corresponds to the connectivity with node labels differing at a certain bit position. For example, FIG. 5 depicts the 3-round connectivity corresponding to the hypercube for N=8 in FIG. 4c. In this particular example, edges in rounds $R_2$, $R_1$ and $R_0$ connect nodes with labels differing in their second, first and zeroth bit (numbered from the right), respectively. In the context of data synchronization, each pair of adjacent nodes in this topology can exchange data directly during a synchronization session at some point in time.

Figure 6:
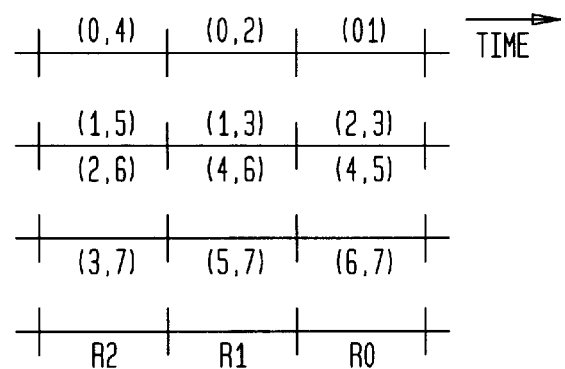
FIG. 6 is a processing schedule for the hypercube topology shown in FIG. 5.

While continuing to use a timer-based processing schedule, the synchronization sessions between pairs of nodes are scheduled to propagate new data from any one node to all other nodes with a maximum update delay of $\log_2 N$ (assuming N is a perfect power of 2) session times. In such a schedule, each round of connectivity also corresponds to one round of synchronization sessions (updates). For the example in FIG. 5, the round $R_2$ of updates allow nodes to synchronize with other nodes if their labels differ in the second bit. Similarly, round $R_1$ and $R_0$ enable data exchanges among nodes with labels differing in the first and zeroth bit, respectively. As a result, the processing schedule as shown in FIG. 6 is obtained where (i,j) denotes a synchronization session between node i and j.

As those skilled in the art will recognize that when N is a perfect power of 2, the hypercube is a useful means to portray the connectivity. However, it is less clear if N is not a perfect power of 2. Solutions developed for the gossiping problem become helpful in understanding and refining the hypercube scheme of the present invention to handle such general cases.

When $N=2^k$, Knodel's method for the gossiping problem is essentially identical to the hypercube scheme where nodes are scheduled to exchange information (data) according to the bit position by which node labels differ from each other. See Knodel, "New Gossips and Telephones," Discrete Mathematics, Vol. 13, pg. 95 (1975). Knodel also devised a schedule for even N. However, this schedule requires significant modifications to accommodate the addition of new nodes to the system. Thus, despite its optimality in delay performance, it is not acceptable for purposes of the present invention. In contrast, Knodel's solution for odd N simply chooses the first $2^{\lfloor \log_2 N \rfloor}$ nodes and has each of the others synchronize with them in the first and last round of updates, while new data propagates according to the hypercube scheme as discussed above for the $2^{\lfloor \log_2 N \rfloor}$ nodes.

By adopting ideas of the Knodel's method for odd N, the hypercube scheme according to the present invention can now be extended to consider all positive integer N. To do this, it must be recognized that the last round of updates in the Knodel's method is not needed for the data synchronization problem because the first and last rounds are identical in terms of their data-exchange function and because the processing schedule for data synchronization is repeated continuously. From this, the construction of the logical topology and processing schedule for the hypercube scheme for any positive integer N for the present invention is described as follows:

a. Label each of the N nodes by a binary string where the bits starting from the right are indexed by 0, 1, 2 and so on.

b. Establish rounds of the connection topology by connecting nodes with labels differing only in the i-bit position at each round $R_i$ where i=0, 1, . . . , $\lfloor_2 N \rfloor - 1$.

c. Establish one round of updates (synchronization sessions) where each pair of adjacent nodes in the corresponding round of connectivity synchronize data.

Figure 7:
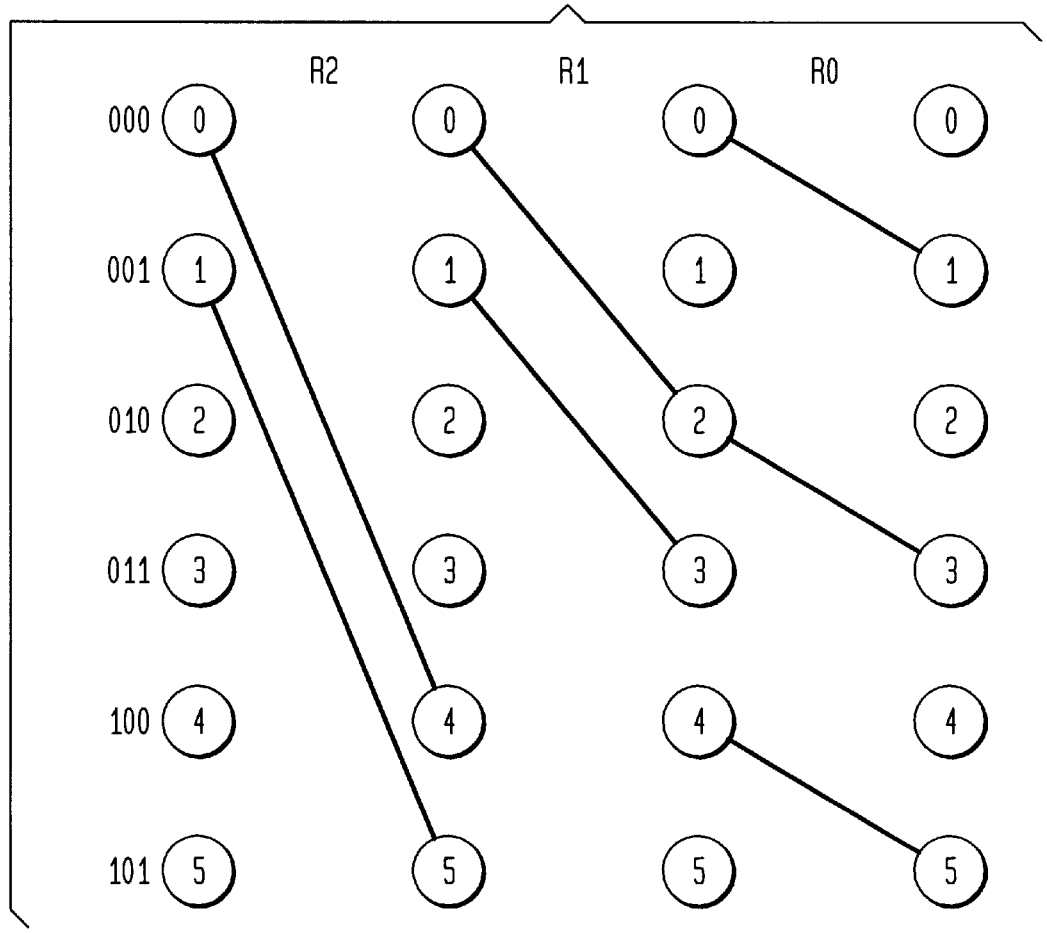
FIG. 7 is a diagram showing the hybercube connectivity according to still another embodiment of the present invention using conventional identification of the various nodes wherein the network has 6 nodes.
Figure 8:
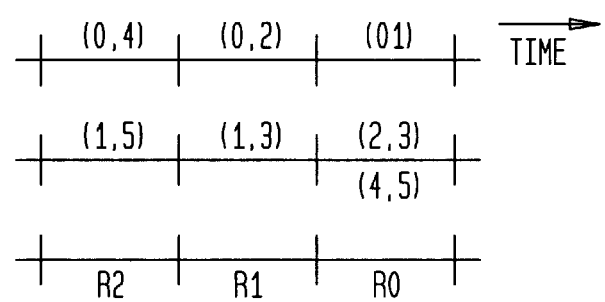
FIG. 8 is a processing schedule for the hypercube topology shown in FIG. 7.

In the following section, this "partial hypercube" of the present invention is proven to work mathematically. To see how this hypercube scheme can operate properly and accommodate additional nodes in the system without changing the existing connectivity and processing schedule, consider two examples for N=6 and 8. The hypercube connectivity for N=8 and N=6 is shown in FIGS. 5 and 7, respectively. In addition, their respective processing schedules are depicted in FIGS. 6 and 8.

The update operations for the case of N=8 have been discussed earlier. After three rounds of updates, all nodes can finish exchange of new data among themselves. As for the case of N=6 in FIG. 7, it is noteworthy that the connectivity in round $R_1$ and $R_0$ for nodes 0 through 3 actually represents a "perfect" hypercube as if they were the only nodes in the system. Thus, the connectivity in these two rounds enables data exchanges among these four nodes in the same way as for the case of N=4. In addition, the connectivity in round $R_2$ enables data exchanges between the rest of the nodes with nodes 0 through 3. (This is identical to the first round in Knodel's method for odd N.) Thus, new data from nodes 4 and 5 can be passed onto node 0 to 3 after a first run of all three rounds of updates. Since the processing schedule is repeated continuously (i.e., round $R_2$ is carried out following round $R_0$), new data from nodes 0 through 3 can also propagate to nodes 4 and 5 at the second run of round $R_2$.

As revealed by Knodel's method, the hypercube scheme with the cyclic processing schedule does not necessarily require the edge between node 4 and 5 in round $R_0$ to enable data exchanges between node 4 (or 5) and nodes 0 through 3. However, the edge is established by the present topology so that no modifications to the connectivity and thus the processing schedule are needed when adding new nodes to the system in the future. As a result, it is important to observe that the connectivity for N=6 in FIG. 7 is simply a subset of that in FIG. 5 for N=8. This lack of a need to modify the existing connectivity and processing schedule when systems grow is a unique, desirable characteristic of the present hypercube topology. With this advantage, systems can grow easily by means of adding new nodes to meet increased customer demands.

It is noteworthy that the hypercube scheme remains applicable when nodes are labeled by d-ary strings with d>2. However, the benefits of such arrangements are likely to be realized if d nodes can exchange data simultaneously in a single synchronization session (i.e., a d-way call). So, the scheme with two nodes involved in a session, as presented above, is more practical and adequate to meet the purposes of the present invention.

To analyze the delay performance of the present invention, let the maximum update delay in units of round of updates be denoted by T (where each round of updates lasts for one session time). As pointed out earlier, the hypercube connectivity for a system with N nodes is a subset of that for N' if N'>N. Therefore, first the maximum update delay for $N=2^m$ will be discussed and then the delay in a system with arbitrary N nodes.

First, it will shown that given $N=2^m$ where $m \in Z^+$, the maximum update delay T is m+1 for a global data file in the hypercube scheme, regardless of when the file is actually updated within the (cyclic) processing schedule.

To show this, let the source and destination node of an update to a global data file be $S \equiv s_{m-1} s_{m-2} \ldots s_0$ and $D \equiv d_{m-1} d_{m-2} \ldots d_0$, respectively, where $s_i$ and $d_i \in \{0,1\}$. Further, the rounds of updates in the processing schedule are denoted by $R_{m-1}, R_{m-2}, \ldots, R_0$. In $R_i$, each node with label $a_{m-1} \ldots a_{i+1} a_i a_{i-1} \ldots a_0$ synchronizes with all other node(s) with label $a_{m-1} \ldots a_{i+1} â_i a_{i-1} \ldots a_0$ where $â_i = 1 - a_i$.

Without loss of generality, suppose that the data file is updated at S immediately after an arbitrary $R_{j+1}$ starts. This results in one round of delay before the data is ready for propagation in the next round $R_j$. Then, according to the processing schedule, the new data propagates from node S to node $s_{m-1} s_{m-2} \ldots s_{j+1} d_j s_{j-1} \ldots s_0$ in $R_j$. As the processing schedule proceeds through $R_{j-1}, \ldots R_0, R_{m-1}, \ldots R_{j+1}$, the updated data finally reaches the destination node $D = d_{m-1} d_{m-2} \ldots d_0$ after a total of m rounds of updates. Thus, T=m+1.

To consider the maximum update delay for systems with arbitrary N, let $2^m < N < 2^{m+1}$ and let the nodes also be indexed by 0, 1, ..., N-1. Furthermore, define $\Omega = \{0, 1, \ldots, 2^m - 1\}$ and $\Sigma = \{2^m, 2^m + 1, \ldots, N-1\}$. Therefore, for $2^m < N < 2^{m+1}$ with $m \Sigma Z^+$, the maximum update delay T for different pairs of source node S and destination node D for a global data file in this hypercube scheme is given by:

a) m+2 if both S and $D \in \Omega$ b) 2(m+1) if $S \Sigma \Omega$ and $D \in \Sigma$ c) 2(m+1) if $S \in \Sigma$ and $D \in \Omega$ and d) 2m+3 if $S \in \Sigma$ and $D \in \Sigma$.

As above, the rounds of updates in the cyclic processing schedule are denoted by $R_m, R_{m-1}, \ldots, R_0$. In $R_i$ for i=m, m-1, ..., 0, each node with label $a_m \ldots a_{i+1} a_i a_{i-1} \ldots a_0$ synchronizes with all other node(s) with label $a_m \ldots a_{i+1} â_i a_{i-1} \ldots a_0$ where $â_i \in \{0,1\} - \{a_i\}$.

By definition of the hypercube scheme, all nodes in $\Omega$ actually form a perfect hypercube. Thus, results for case a) are obvious from the above delay result for systems with N being a prefect power of 2 because all rounds of updates, namely $R_{m-1}, R_{m-2}, \ldots$, and $R_0$, needed to complete data exchanges among all nodes in $\Omega$ to be processed after m+1 rounds of updates (only $R_m$ is considered unproductive). Beside this delay, up to one additional round of delay can incur if the update arrives immediately after the start of a round.

To consider case b), recall that a node in $\Sigma$ synchronizes with its mate node in $\Omega$ (the one with the m'th bit set to one.) only during $R_m$. It may synchronize with other nodes in $\Sigma$, but in the worst case a destination node $D \in \Sigma$ must receive the updated data from its mate node $\overline{D}$ and only during $R_m$. Furthermore, in order for node D to receive the new data, the data must have already propagated from the source node $S \in \Omega$ to $\overline{D}$ prior to $R_m$. Since S and $\overline{D}$ may differ in bit m-1, the longest delay occurs when the associated data file was updated at S immediately after the start of $R_m$. As a result, the new data will not propagate to $\overline{D}$ in the following m rounds of updates, namely $R_{m-1}, R_{m-2}, \ldots, R_0$. Consequently, the time interval for the m rounds plus the following $R_m$ is wasted as far as the propagation of the new data is concerned. However, by the arguments set forth above, the new data will reach all nodes in $\Omega$, including $\overline{D}$, in the second run of the m rounds, $R_{m-1}, R_{m-2}, \ldots$, and $R_0$. Finally, the destination node D receives the updated data during the second run of $R_m$. Thus, the maximum update delay for case b) is 2(m+1).

Following the same arguments for case b), the maximum delay for case c) occurs when the data file is updated at a source node S in $\Sigma$ immediately after the start of $R_m$. In this situation, the new data cannot be passed from S to its mate $\overline{S}$ in $\Omega$ during $R_m$. As a result, the time interval for $R_m$ and the following m rounds, $R_{m-1}, R_{m-2}, \ldots$, and $R_0$, is wasted as far as the data propagation from S to D is concerned. This accounts for a total of m+1 rounds of updates. At the second run of $R_m$, the new data is finally passed from S to $\overline{S}$. By the arguments set forth above, the destination node D in $\Omega$ definitely receives the updated data in the next m rounds of updates. Thus, the total delay is again 2(m+1).

For case d), the longest update delay occurs when the new data has to propagate from $S \in \Sigma$ to $D \in \Sigma$ via some intermediate nodes in $\Omega$. This is so because the nodes in $\Sigma$ may not form a connected graph. Following the above arguments, the maximum delay is realized when the data file is updated immediately after the start of $R_m$. Since the new data cannot be passed from S to any node in $\Omega$, the following m+1 rounds of updates (i.e., $R_m, R_{m-1}, \ldots, R_0$) are wasted for the data propagation from S to D. In the second run of the schedule, starting with $R_m$ and $R_{m-1}$ through $R_0$, the new data reaches all nodes in $\Omega$ by the end of $R_0$. Then, in the third run of $R_m$, the new data is passed from node $\overline{D}$ in $\Omega$ to node D in $\Sigma$. As a result, the total delay in units of rounds is 2(m+1)+1 for case d).

In order to determine the processing complexity of the present invention, the number of sessions processed in each round of updates in the schedule must be analyzed. Then, the processing complexity for the hypercube scheme can be obtained in terms of the total number of synchronization sessions processed for the longest update path described above.

To do this analysis, assume each of the N nodes in the system have a label expressed in binary form. Furthermore, let $N-1 = (n_m n_{m-1} \ldots n_0)_2$ where $n_i = 0$ or 1. For $0 \leq i \leq m$, define $K_i$ to be the total number of synchronization sessions processed at round $R_i$. Given this then, for $0 \leq i \leq m$, $$K_i = \begin{cases} \sum_{j=i}^{m-1} 2^j n_{j+1} & \text{if } n_i = 0 \\ \sum_{j=i}^{m-1} 2^j n_{j+1} + \sum_{j=0}^{i-1} 2^j n_{j+1} & \text{if } n_i = 1 \end{cases}$$

This can be proven by first considering $n_i = 0$ and therefore, at round $R_i$, all nodes with labels from 0 to $(n_m n_{m-1} \ldots n_{i+1} 0 \ldots 0)_2 - 1$ are involved in the synchronization sessions. This is so because all these nodes can find their counterpart nodes with labels differing in the $i^{th}$ bit (i.e., the bit position of $n_i$). In total, there are $$\sum_{j=i+1}^{m} 2^j n_j$$

nodes. On the other hand, nodes with labels from $(n_m n_{m-1} \ldots n_{i+1} n_i 0 \ldots 0)_2$ to $(n_m n_{m-1} \ldots n_{i+1} n_i \ldots n_0)_2$ cannot find their counterpart nodes to synchronize data at round $R_i$ because they do not exist as $n_i = 0$. Changing the index in the summation $$\sum_{j=i+1}^{m} 2^j n_j$$

and observing that two nodes are involved in each synchronization session yield the result.

For $n_i=1$, the $$\sum_{j=i+1}^{m} 2^j n_j$$

nodes continue to find their counterpart nodes for data synchronization. In addition, as $n_i=1$, some nodes with labels from $(n_m n_{m-1} \ldots n_{i+1} 0 \ldots 0)_2$ to $(n_m n_{m-1} \ldots n_{i+1} 01 \ldots 1)_2$ can also be involved in synchronization sessions at $R_i$ with some nodes with labels ranging from $(n_m n_{m-1} \ldots m_{i+1} 10 \ldots 0)_2$ to $(n_m n_{m-1} \ldots n_{i+1} 1 n_{i-1} \ldots n_0)_2$, as long as these counterpart nodes exist. The proof is completed because the number of these counterpart nodes existing in the system is given by $$\sum_{j=0}^{i-1} 2^j n_j + 1.$$

The processing complexity of the hypercube scheme is defined as the number of synchronization sessions processed during the maximum update delay for any node pair. Therefore, case d) yields the maximum update delay and using results above, the processing complexity for the present invention is obtained, wherein the processing complexity for the hypercube scheme is $$\sum_{i=0}^{m} K_i + K_m$$

where $K_i$ for $0 \leq i \leq m$ is given by the equation 1 above.

In the following, the degree of failure tolerance as well as the increase in update delay under failure for the case where N is a perfect power of 2 will be discussed for the present invention. Then, the failure tolerance for the case of general N for the hypercube scheme according to the present invention will be shown.

For the hypercube scheme with $N=2^m$ for $m \epsilon Z^+$, if one node fails, the maximum update delay T in units of update round is at most $m+2$ (i.e., one more round than normal) for any global data file.

To show this, let an arbitrary source and destination node of an update for a global data file be $S \equiv s_{m-1} s_{m-2} \ldots s_0$ and $D \equiv d_{m-1} d_{m-2} \ldots d_0$ respectively, where $s_i$ and $d_i \epsilon \{0,1\}$. Moreover, let the file be updated at S immediately after the start of $R_{j+1}$, thus resulting in one round of delay until the updated data can be passed to other nodes starting at round $R_j$. Then, by the cyclic processing schedule of the hypercube scheme, the shortest (update) path to propagate updated data from S to D without node failure consists of the following intermediate nodes:

TABLE 1

| Round | $s_{m-1}s_{m-2} \cdots s_{j+1}s_js_{j-1} \cdots s_0$ |
|---|---|
| $R_j$ | $s_{m-1}s_{m-2} \cdots s_{j+1}d_js_{j-1} \cdots s_0$ |
| $R_{j-1}$ | $s_{m-1}s_{m-2} \cdots s_{j+1}d_jd_{j-1} \cdots s_0$ |
| . | |
| . | |
| . | |
| $R_0$ | $s_{m-1}s_{m-2} \cdots s_{j+1}d_jd_{j-1} \cdots d_0$ |
| $R_{m-1}$ | $d_{m-1}s_{m-2} \cdots s_{j+1}d_jd_{j-1} \cdots d_0$ |
| . | |
| . | |
| . | |
| $R_{j+2}$ | $d_{m-1}d_{m-2} \cdots s_{j+1}d_jd_{j-1} \cdots d_0$ |
| $R_{j+1}$ | $d_{m-1}d_{m-2} \cdots d_{j+1}d_jd_{j-1} \cdots d_0$ |

The preceding table shows the update path from S to D in normal situations. Further, let U be the set of these intermediate nodes, excluding S and D and assume that set F is the failed node. If $U \cap F = \emptyset$, then the above update path is still operational and the update delay T remains $m+1$.

For $U \cap F \neq \emptyset$, consider the following set of update paths from S to D:

TABLE 2

| Round | $s_{m-1}s_{m-2} \cdots s_{j+1}s_js_{j-1} \cdots s_0$ |
|---|---|
| $R_j$ | $s_{m-1}s_{m-2} \cdots s_{j+1}\bar{d}_js_{j-1} \cdots s_0$ |
| $R_{j-1}$ | $s_{m-1}s_{m-2} \cdots s_{j+1}\bar{d}_jd_{j-1} \cdots s_0$ |
| . | |
| . | |
| . | |
| $R_0$ | $s_{m-1}s_{m-2} \cdots s_{j+1}\bar{d}_jd_{j-1} \cdots d_0$ |
| $R_{m-1}$ | $d_{m-1}s_{m-2} \cdots s_{j+1}\bar{d}_jd_{j-1} \cdots d_0$ |
| . | |
| . | |
| . | |
| $R_{j+2}$ | $d_{m-1}d_{m-2} \cdots s_{j+1}\bar{d}_jd_{j-1} \cdots d_0$ |
| $R_{j+1}$ | $d_{m-1}d_{m-2} \cdots d_{j+1}\bar{d}_jd_{j-1} \cdots d_0$ |
| $R_j$ | $d_{m-1}d_{m-2} \cdots d_{j+1}d_jd_{j-1} \cdots d_0$ |

This table shows the update path from S to D when at most one node fails where $\bar{d}_j = 1-d_j$. This set of nodes describes another update path. Let the set of intermediate nodes (excluding S and D) in this path be denoted by V. By construction then, the update path with V consists of $m+1$ rounds of updates. Combining this with the round wasted at which the update arrives, the update delay T is $m+2$ rounds. Furthermore, $U \cap V \neq \emptyset$ simply because $\bar{d}_j \neq d_j$. Consequently, U and V represent two disjoint update paths from S to D. Given that at most one node fails, at least one of the paths remains unaffected by the failures and the delay is at most $m+2$.

The hypercube scheme of the present invention actually can tolerate more than one node failure, but the maximum update delay is further increased. This is true because for the hypercube scheme with $N=2^m$ for $m,k \epsilon Z^+$ and $k \leq m-1$, if no more than k nodes fail, then all data will propagate and the maximum update delay T is at most $m+k+2$ (i.e., $k+1$ more rounds than normal) for any global data file. This may be shown by, as before, letting the cyclic processing schedule for the hypercube scheme be $R_{m-1}R_{m-2}, \ldots, R_0$, where nodes in $R_i$ synchronize data with other nodes with labels differing at the $i^{th}$ bit position. Further, assume that an update to a global data file is made at arbitrary node $S \equiv s_{m-1}s_{m-2} \ldots s_0$ just after $R_{j+1}$ starts. After a delay of one round, the updated data is ready to be propagated in $R_j$. Therefore, it needs to be shown that the updated data can reach any arbitrary destination $D \equiv d_{m-1}d_{m-2} \ldots d_0$ in the following $m+k+1$ rounds. Under normal conditions, the update can propagate along the shortest path P from S to D described in Table 1. So if U is the set of intermediate nodes in the path and F is used to denote the set of failed nodes and F∩U=Ø, the path P is still operational and the update delay T remains m+1, as shown above. Otherwise, given k≦m−1, k+1 update paths can be constructed and denoted by $P_i$ where i=j, j−1, . . . , j−k as follows. (Possibly i=j, j−1, . . . , 0, m−1, . . . , m+j−k for small j or large k.) Each path $P_i$ is obtained by observing the delayed propagation of the updated data from S for (j−i+m) mod m rounds starting from $R_j$, and then passing the data at the next round $R_i$ from S to the node with label where the bit is $\overline{d}_i = 1 = d_i$. The data continues to propagate in the next m−1 successive rounds starting from $R_{i−1}$ (or $R_{m−1}$ if i=0) to the nodes with the bits associated with the rounds identical to the corresponding ones in D. Finally, when $R_i$ comes again, the updated data is passed to D from the node with the $i^{th}$ bit being $\overline{d}_i$. For example:

TABLE 3

| Round | $s_{m-1}s_{m-2} \cdots s_{j+1}s_js_{j-1} \cdots s_0$ |
|---|---|
| $R_j$ | $s_{m-1}s_{m-2} \cdots s_{j+1}\overline{d}_js_{j-1} \cdots s_0$ |
| $R_{j-1}$ | $s_{m-1}s_{m-2} \cdots s_{j+1}\overline{d}_jd_{j-1} \cdots s_0$ |
| . | |
| . | |
| . | |
| $R_0$ | $s_{m-1}s_{m-2} \cdots s_{j+1}\overline{d}_jd_{j-1} \cdots d_0$ |
| $R_{m-1}$ | $d_{m-1}s_{m-2} \cdots s_{j+1}\overline{d}_jd_{j-1} \cdots d_0$ |
| . | |
| . | |
| . | |
| $R_{j+2}$ | $d_{m-1}d_{m-2} \cdots s_{j+1}\overline{d}_jd_{j-1} \cdots d_0$ |
| $R_{j+1}$ | $d_{m-1}d_{m-2} \cdots d_{j+1}\overline{d}_jd_{j-1} \cdots d_0$ |
| $R_j$ | $d_{m-1}d_{m-2} \cdots d_{j+1}d_jd_{j-1} \cdots d_0$ |

The above table is the update path for $P_j$ and the update path for $P_{j-1}$ is in the following table:

TABLE 4

| Round | $s_{m-1}s_{m-2} \cdots s_{j+1}s_js_{j-1}s_{j-2} \cdots s_0$ |
|---|---|
| $R_j$ | $s_{m-1}s_{m-2} \cdots s_{j+1}s_j\underline{s}_{j-1}s_{j-2} \cdots s_0$ |
| $R_{j-1}$ | $s_{m-1}s_{m-2} \cdots s_{j+1}s_j\overline{d}_{j-1}s_{j-2} \cdots s_0$ |
| $R_{j-2}$ | $s_{m-1}s_{m-2} \cdots s_{j+1}s_j\overline{d}_{j-1}d_{j-2} \cdots s_0$ |
| . | |
| . | |
| . | |
| $R_0$ | $s_{m-1}s_{m-2} \cdots s_{j+1}s_j\overline{d}_{j-1}d_{j-2} \cdots d_0$ |
| $R_{m-1}$ | $d_{m-1}s_{m-2} \cdots s_{j+1}s_j\overline{d}_{j-1}d_{j-2} \cdots d_0$ |
| . | |
| . | |
| . | |
| $R_{j+2}$ | $d_{m-1}d_{m-2} \cdots s_{j+1}s_j\overline{d}_{j-1}d_{j-2} \cdots d_0$ |
| $R_{j+1}$ | $d_{m-1}d_{m-2} \cdots d_{j+1}s_j\overline{d}_{j-1}d_{j-2} \cdots d_0$ |
| $R_j$ | $d_{m-1}d_{m-2} \cdots d_{j+1}d_j\overline{d}_{j-1}d_{j-2} \cdots d_0$ |
| $R_{j-1}$ | $d_{m-1}d_{m-2} \cdots d_{j+1}d_jd_{j-1}d_{j-2} \cdots d_0$ |

By construction, each path $P_i$ has a delay of (j−i+m) mod m+(m+1) rounds for each i=j, j−1, . . . , j−k (or i=j, j−1, . . . , 0, m−1, . . . , m+j−k for small j or large k). Therefore, including the initial waiting in $R_{j+1}$ when the update arrives, the longest update delay among all $P_i$'s is m+k+2 update rounds.

Furthermore, it can be shown that each of these paths are node-disjoint with each other so that any k failures will leave at least one of the k+1 paths still operational.

The degree of failure tolerance is typically defined as the maximum number of node failures under which each remaining node can still exchange data, directly or indirectly via some intermediate nodes, with all other operational nodes. The following will describe the degree of failure tolerance for the present invention.

Based on the delay result for $N=2^m$ with m−1 node failures, the hypercube scheme according to the present invention will have a degree of failure tolerance of m−1. Assuming, however, that N is not a perfect power of 2, the connectivity of the partial hypercube and thus the degree of failure tolerance will be:

$$f = \sum_{i=0}^{m} n_j - 1$$

where $2^m < N \leq 2^{m+1}$ with $N=(n_m n_{m-1} \cdots n_0)_2 + 1$. This can be proved by observing that if $N=2^{m+1}$, then $$\sum_{i=0}^{m} n_i = (m+1)$$

according to the above and that if $N < 2^{m+1}$, then $$\sum_{i=0}^{m} n_i \leq m.$$

The latter statement can be proven by induction on m. For m=1, we have N=3 and the nodes are disconnected if node 0 fails. Thus, the result is correct. Further, assuming that the above is true for $N < 2^m$, the following will show that it is true for $N < 2^{m+1}$.

To show this first, define Ω to be the set of nodes with bit m equal to 0 and Σ the set of nodes with bit m equal to 1. Then let S and D be an arbitrary source and destination as before. It can be shown that there exist f+1 node disjoint paths between S and D. This is equivalent to showing the partial hypercube is f+1 connected.

Case A) S,D∈Ω: Ignoring the $m^{th}$ bit (which is 0 for all nodes in Ω), it can be seen that Ω is a perfect hypercube of size $d^m$. In the case of $N=2^m$, there exists m disjoint paths within Ω between S and D. Since $$m \geq \sum_{i=0}^{m-1} n_i = f + 1,$$

therefore this case is shown.

Case B) S,D∈Σ: In this case, when ignoring the $m^{th}$ bit, Σ is a partial hypercube with $N' < d^m$.

By the inductive step, then there exists $$\sum_{i=0}^{m-1} n_i = f$$

disjoint paths between S and D within Σ. Let $S_0$ and $D_0$ denote the nodes in Ω where bit m of S and D are set to 0. Since Ω is a connected subgraph, then there is a path from $S_0$ to $D_0$ within Ω. This provides one additional disjoint path and proves this case.

Case C) S∈Σ and D∈Ω: There exists a matching of size f+1 between nodes in Σ and those in Ω. This may be created by simply picking any f+1 nodes in Σ and changing bit m from 1 to 0 to connect each of these nodes to a unique node in Ω. If any f points are removed from the total hypercube, then there still must be a matched pair of nodes between Σ and Ω, call them a and b respectively. Now cases A and B above show that any two nodes in Σ or two nodes in Ω are connected by f+1 disjoint paths. Thus, there still exists a path remaining between S and a and between b and D. Therefore, there still exists a path from S to D and the hypercube is f+1-connected.

Case D) S∈Ω and D∈Σ: Same proof as case C.

In many cases, a copy of a non-global data file must be replicated on an intermediate node to enable new data associated with a file to be propagated via that node. For example, let $2^m < N \leq 2^{m+1}$ and the nodes be labeled from 0 to N−1 expressed in binary form, then, when users at two arbitrary nodes $S \equiv s_m s_{m-1} \ldots s_0$ and $D \equiv d_m d_{m-1} \ldots d_0$ share a non-global data file, the system administrator needs to replicate the file on a set of intermediate nodes for the purpose of data synchronization. Thus, there are two competing objectives at play here. One is to minimize the number of intermediate nodes at which this data is replicated and two is to minimize the update delay. Two methods are discussed further to identify these intermediate nodes.

In the first method, the delay criteria is emphasized, by finding the shortest path from S to D and the shortest path from D to S. Although a generic shortest path algorithm could be used, the following paths are usually acceptable. By propagating data through a sequence of nodes with one-bit difference at each round starting from S in round $R_m$, a set U of the intermediate nodes is obtained, namely, $U = \{d_m s_{m-1} s_{m-2} \ldots s_0, d_m d_{m-1} s_{m-2} \ldots s_0, \ldots, d_m d_{m-1} \ldots d_0\}$. If all nodes in U exist in the system, U represents a shortest update path from S to D. Otherwise, one can always find a feasible path with $U = \{0 s_{m-1} s_{m-2} \ldots s_0, 0 d_{m-1} s_{m-2} \ldots s_0, \ldots, 0 d_{m-1} d_{m-2} \ldots d_0, d_m d_{m-1} d_{m-2} \ldots d_0\}$ because those nodes with the left-most bit being zero always exist in the system. Similar to the update path in Table 1, the intermediate nodes in U follow the sequence of the processing schedule, thus yielding a low delay to propagate data from S to D.

Since data propagates bidirectionally between each pair of nodes involved in a synchronization session, U in principle also enables data propagation from D to S. However, such a path yields a long delay because U does not follow the sequence of nodes to support efficient data propagation from D to S. To remedy this and to enhance the failure tolerance for non-global data files, the above method is applied to identify another set V of intermediate nodes for data propagation from D to S. When N is a perfect power of 2, U and V actually represent two node-disjoint paths.

It should be noted the shortest paths between S and D may depend on the number of nodes in the system at the time of creation of the non-global file. If the number of nodes in the system N changes then there could be different update paths U and V for different files even though they are shared by the same pair of users at two fixed nodes. If the system records the intermediate nodes for each non-global data file for maintenance, failure recovery and other system administration purposes, the current value of N can be made as a permanent attribute for each file when the method is applied to find the corresponding intermediate nodes. Once N is fixed and known for a non-global file, its U and V are uniquely and readily obtained at a later time.

The second method is needed, if the system requires that all non-global data files shared by the same pair of users have identical intermediate nodes, despite constant changes of the number of nodes in the system. To identify the paths U and V for the given S and D in this case, the second method finds the maximum of S and D. To do this without loss of generality, let D be the maximum. Then, the second method follows the first one, except that the number of nodes is deliberately assumed to be D (instead of N) when identifying U and V. This way, all intermediate nodes for the given S and D are kept identical all the times at the expense of possibly longer update delay because part of the connectivity in the hypercube topology (i.e., that among nodes D+1 to N−1) is not utilized for possibly more efficient data propagation.

In a third embodiment, a generalization of the hypercube schedule for the number of nodes being a perfect power of 2 ($N = 2^m$) is used. This generalized embodiment scheme again employs the labeling of nodes by their binary representation, but the matchings used to determine the update schedule is no longer confined to hypercube edges. Instead, if $x = (x_1, \ldots, x_m)$ is a non-zero binary vector, then $M_x$ is denoted as the matching which for each u, pairs the node labeled u with the node labeled x+u. (Here addition is coordinatewise and modulo 2, so that x+u+u=x and therefore the pairing relation is symmetric.)

The matchings employed by the standard hypercube solution to gossiping in rounds are just $M_x$ for x=000 . . . 010 . . . 0. If the matchings corresponding to all the non-zero vectors in some order, say x(1),x(2), . . . , x(N−1) and back to x(1), are cycled through, then each node is paired with every other. In other words, the desired complete topology is achieved. But, the maximum update delay will generally be larger than m. Fortunately, optimality of the update delay turns out to be equivalent to a simple condition.

The scheme which cycles through matchings $M_{x(1)} \ldots, M_{x(N-1)}$, where the x(i)'s run through all the non-zero binary vectors of length m, achieves maximum update delay m if and only if for every i, the vectors x(i),x(i+1), . . . , x(i+m−1) (with indices taken modulo N−1) are linearly independent over GF(2).

To see that this is true, suppose node u receives a new update just prior to round i and let v be any other node. Then if x(i), . . . , x(i+m−1) are linearly independent, they constitute a basis for GF(2) and thus:

$$v - u = x(i_1) + x(i_2) + \ldots + x(i_k)$$

for $i_1, \ldots, i_k$ with $i \leq i_1 < i_2 < \ldots < i_k \leq i+m-1$. But, then the path $u, u+x(i_1), u+x(i_1)+x(i_2), \ldots$ takes the update information from u to v as required.

On the other hand if x(i), . . . , x(i+m−1) are not linearly independent, then they do not span $GF(2)^m$ and there is a vector y which is not expressible as a linear combination. Therefore, there is no path from u to u+y during the upcoming m rounds.

In view of the above, a listing of the non-zero members of $GF(2)^m$ are needed in which any m in a row (including "around the corner") are independent. This can be obtained by starting anywhere and applying a "full-cycle shift register".

An order-m linear shift register is a sequence of m boxes $b_1, \ldots, b_m$, each of which contains a bit, and some of which are "tapped." At each tick of a clock the bits move to the right one box, the rightmost bit dropping off into oblivion. The new leftmost bit is the mod-2 sum of the old bits in the tapped boxes. For example, suppose the tapped boxes are $b_2$, $b_3$ and $b_5$. Then if the current state is $x = x_1, \ldots, x_m$, then the next state will be $y = y_1, \ldots, y_m$ where $y_{i+1} = x_i$ and $y_1 = x_2 + x_3 + x_5$. More generally, if we define $c_i = 1$, if $b_i$ is tapped and $c_i = 0$ otherwise, and the contents of the shift register at time t is denoted by $x(t) = x_1(t), \ldots, x_m(t)$, then $$x_{i+1}(t+1) = x_i(t) \text{ for } i=1=2, \ldots, m \text{ and}$$

$$x_1(t+1 = c_1 x_1(t) + \ldots + c_m x_m(t).$$

In fact, the contents of the first box $x_1(t)$ satisfy the recursion:

$$x_1(t)=c_1x_1(t-1)+c_2x_1(t-2)+\ldots+c_mx_1(t-m)$$

since $x_1(t-i)$ is the same as $x_{1+i}(t)$. In fact every box satisfies the same recursion, so the vector equation can be written as:

$$x(t)=c_1x(t-1)+\ldots+c_mx(t-m).$$

If a shift register is started with all zeroes, it goes nowhere, but otherwise it will cycle through all non-zero vectors before it returns to its starting state. The theory of shift registers (see e.g., Golomb, 1967) explains this.

Let $f(z)$ be the polynomial $1+c_1z+c_2z^2+\ldots c_mz^m$. Then the shift register is "full-cycle" just when $f(z)$ is irreducible over $GF(2)$ and its smallest multiple of the form $1+z^k$ is for $k=2^m-1$.

Fortunately, there are plenty of polynomials with this property, in fact exactly $q/m$ of them where q is the number of proper irreducible fractions of the form $i/(2^m-1)$. Examples of this are:

$m=2, f(z)=1+z+z^2$, c=11;
$m=3, f(z)=1+z+z^3$, c=101;
$m=4, f(z)=1+z^3+z^4$, c=0011;
$m=5, f(z)=1+z^3+z^5$, c=00101.

The resulting vector sequences, starting with 00 . . . 01 then are:

m=2: 01, 10, 11, 01, . . .
m=3: 001, 100, 110, 111, 011, 101, 010, 001, . . .
m=4: 0001, 1000, 0100, 0010, 1001, 1100, 0110, 1011, 0101, 1010, 1101, 1110, 1111, 0111, 0011, 0001, . . .

The optimal update delay is a result of the vector equation above which states that each vector is a linear combination of the previous m vectors. If any m-in-a-row fail to be independent, then all subsequent vectors (therefore all vectors) would be limited to the subspace spanned by those m vectors, but in fact all non-zero vectors appear.

In terms of delay impacts due to failures the classic hypercube structure had the nice property that maximum update delay increases by only 1 in that case (best possible); interestingly, that nice property also follows from m-in-a-row independence. Suppose that node u is updated just prior to round t−1, with the idea of showing that there are two node-disjoint paths from u to v during the next m+1 rounds. We know there is a path P from u to v during rounds t through t+m−1, and a path Q from u+x(t−1) to v during the same period. Suppose P and Q have a node in common other than v itself; then we have $$u+x(i_1)+x(i_2)+\ldots+x(i_r)=u+x(t-1)+x(j_1)+\ldots+x(j_s)$$

where all of the subscripted i's and j's lie between t and t+m−2. But then we have x(t−1) expressed as a linear combination of the m−2 vectors x(t), x(t+1), . . . , x(t+m−2), contradicting the fact that x(t−1) through x(t+m−2) are supposed to be independent.

The case of multiple node failures is more complex, but since the topology is complete, any number of node failures is overcome via update delay of no more than N−1 rounds.

Since the topology is complete, this generalization has the potentially significant advantage of allowing non-global data files to be updated without any intermediate nodes involved. Of course, there will be an increase in update delay.

Although the present invention has been described using only three embodiments, numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed is:

1. A synchronization method for distributed processing systems having replicated data comprising the steps of:
    establishing a network of computing nodes, each node having at least one data file to be shared with at least one other node;
    implementing a ShuffleNet topology to control the flow of new data among the computing nodes, wherein there are an even number, N=2m, of nodes in the network;
    organizing the computing nodes into two sets, $X=x_0, \ldots, x_{m-1}$ and $Y=y_0, \ldots, y_{m-1}$, wherein the subscripts are always to be taken modulo m and x and y are used as set designations;
    synchronizing simultaneously the nodes in X with nodes in Y according to a matching between the two sets wherein rounds of communication are grouped into two batches.

2. The method of claim 1 wherein each batch consists of rounds, $R_{2j-1}$ $R_{2j}$ for $j \geq 1$, and in each odd batch, $B_{2j-1}$, each $x_i$ synchronizes with $y_{2i+2j-2}$ and with $y_{2i+2j-1}$ and in even batches, $B_{2j}$, each $y_i$ synchronizes with $x_{2i+2j-2}$ and $x_{2i+2j-1}$, i and j designate different integers corresponding to different nodes designations.

3. The method of claim 1 wherein a timer based schedule is utilized to synchronize the nodes in X with the nodes in Y.

4. The method of claim 1 wherein a precedence relationship based schedule is utilized to synchronize the nodes in X with the nodes in Y.

5. The method of claim 1 wherein a continuously repeating schedule is utilized to synchronize the nodes in X with the nodes in Y.

6. The method of claim 1 wherein the data files are global data files.

7. The method of claim 1 wherein the data files are a mixture of global and non-global data files.

8. A synchronization method for distributed processing systems having replicated data comprising the steps of:
    establishing a network of computing nodes, each node having at least one data file to be shared with at least one other node;
    implementing a hypercube topology to control the flow of new data among the computing nodes, wherein each node is labeled by a binary string and any two nodes which have their label differing by one bit are connected by an edge and only adjacent nodes can communicate and exchange data directly, wherein a timer based schedule is utilized to synchronize the computing nodes.

9. The method of claim 8 wherein edges in round, $R_n$, connect nodes with labels differing in their $n^{th}$ bit numbered in predetermined fashion and each round of connectivity corresponds to one round of synchronization sessions.

10. The method of claim 8 further comprising the steps of:
    labeling each of the N nodes by a binary string where the bits starting from the right are indexed by 0, 1, 2, . . . N;
    establishing rounds of the connection topology by connecting nodes with labels differing only in the i-bit position at each round $R_i$ where i=0, $\lceil \log_2 N \rceil - 1$;
    establishing one round of updates where each pair of adjacent nodes in the corresponding round of connectivity synchronize data.

11. A synchronization method for distributed processing systems having replicated data comprising the steps of:

establishing a network of computing nodes, each node having at least one data file to be shared with at least one other node;

implementing a hypercube topology to control the flow of new data among the computing nodes, wherein each node is labeled by a binary string and any two nodes which have their label differing by one bit are connected by an edge and only adjacent nodes can communicate and exchange data directly, wherein a precedence relationship based schedule is utilized to synchronize the computing nodes.

12. A synchronization method for distributed processing systems having replicated data comprising the steps of:

establishing a network of computing nodes, each node having at least one data file to be shared with at least one other node;

implementing a hypercube topology to control the flow of new data among the computing nodes, wherein each node is labeled by a binary string and any two nodes which have their label differing by one bit are connected by an edge and only adjacent nodes can communicate and exchange data directly, wherein a continuously repeating schedule is utilized to synchronize the computing nodes.

13. A synchronization method for distributed processing systems having replicated data comprising the steps of:

establishing a network of computing nodes, each node having at least one data file to be shared with at least one other node;

implementing a generalized hypercube like topology to control the flow of data files among the computing nodes, wherein each node is labeled by a binary string and any two nodes labels $x=(x_1, \ldots, x_m)$ which have a non-zero binary vector and pairs are matched such that a matching of pairs, $M_x$, pairs a node labeled u with a node labeled x+u wherein the addition is coordinate-wise and modulo 2, so that x+u+u=x and pair matching is symmetric.

14. The method of claim 13 wherein each pair of adjacent nodes in the topology can exchange data directly during a synchronized session at some point in time.

15. The method of claim 13 further comprising the step of cycling through matchings $M_{x(1)}, \ldots, M_{x(N-1)}$, where the x(i)'s run through all the non-zero binary vectors of length m, thereby achieving a maximum update delay m if and only if for every i, the vectors x(i),x(i+1), ..., x(i+m−1) with indices taken modulo n−1 are linearly independent over a predetermined function.

16. The method of claim 15 wherein the step of cycling utilizes a linear shift register.

17. The method of claim 13 wherein a non-global data files are updated without any intermediate nodes.

18. The method of claim 13 wherein a timer based schedule is utilized to synchronize the computing nodes.

19. The method of claim 13 wherein a precedence relationship based schedule is utilized to synchronize the computing nodes.

20. The method of claim 13 wherein a continuously repeating schedule is utilized to synchronize the computing nodes.

* * * * *